(12) United States Patent
Kotliar

(10) Patent No.: US 6,334,315 B1
(45) Date of Patent: Jan. 1, 2002

(54) HYPOXIC FIRE PREVENTION AND FIRE SUPPRESSION SYSTEMS FOR COMPUTER CABINETS AND FIRE-HAZARDOUS INDUSTRIAL CONTAINERS

(76) Inventor: Igor K. Kotliar, 50 Lexington Ave. Suite 249, New York, NY (US) 10010

( * ) Notice: Subject to any disclaimer, the term of this patent is extended or adjusted under 35 U.S.C. 154(b) by 0 days.

(21) Appl. No.: 09/566,506

(22) Filed: May 8, 2000

Related U.S. Application Data

(63) Continuation-in-part of application No. 09/551,026, filed on Apr. 17, 2000.
(51) Int. Cl.[7] ................................................ F24F 3/16
(52) U.S. Cl. .................... 62/78; 95/47; 95/54; 169/54
(58) Field of Search ............................. 95/47, 54; 62/78; 169/54

(56) References Cited

U.S. PATENT DOCUMENTS

| | | | | |
|---|---|---|---|---|
| 4,896,514 A | * | 1/1990 | Sugiyama et al. ............... | 62/78 |
| 5,063,753 A | * | 11/1991 | Woodruff .......................... | 62/78 |
| 5,388,413 A | * | 2/1995 | Major et al. ..................... | 62/911 |
| 5,472,480 A | * | 12/1995 | Barbe ................................ | 95/54 |
| 5,649,995 A | * | 7/1997 | Gast, Jr. ............................ | 95/54 |
| 5,799,495 A | * | 9/1998 | Gast, Jr. ............................ | 62/78 |
| 5,921,091 A | * | 7/1999 | Foss et al. ...................... | 62/46.1 |

\* cited by examiner

Primary Examiner—Ronald Capossela
(74) Attorney, Agent, or Firm—Firepass.com

(57) ABSTRACT

Fire prevention and suppression system is provided for computer cabinets and fire-hazardous containers. The equipment of the system provides low-oxygen environments at standard atmospheric pressure. The system employs an oxygen-extraction apparatus that supplies oxygen-depleted air inside an enclosed area communicating with the device. A fire-extinguishing composition is provided for continuous use in computer cabinets and fire-hazardous containers, consisting of oxygen-depleted air having oxygen content below 12%.

5 Claims, 3 Drawing Sheets

HYPOXIC FIRE PREVENTION AND FIRE SUPPRESSION SYSTEMS FOR COMPUTER CABINETS AND FIRE-HAZARDOUS INDUSTRIAL CONTAINERS

RELATED APPLICATIONS

This invention is related to preceding U.S. Pat. No. 5,799,652 issued Sept. 1, 1998, U.S. Pat. No. 5,887,439 issued Mar. 30, 1999, U.S. Pat. No. 5,924,419 of Jul. 20, 1999 and is continuation in part of the U.S. patent application Ser. No. 09/551,026 filed on Apr. 17, 2000.

FIELD OF THE INVENTION

The present invention relates to a process and equipment for providing low-oxygen (hypoxic) environments inside a computer cabinet or container with combustible or explosive material in order to prevent or suppress fire before it starts.

The demand in reliable fire prevention and suppression systems for industrial applications has been always very high and is growing extensively, especially with the explosive development of Internet, computerized equipment and communication systems. The invented Fire Prevention And Suppression System can be used in any possible application where a non-occupied environment requires protection from fire hazard or explosion.

DESCRIPTION OF THE PRIOR ART

At the present time there are no products on the market that would allow to prevent fire from igniting inside computer cabinets or other industrial enclosures containing inflammable or explosive materials. A computer or server produces a lot of heat inside its enclosure or cabinet, mainly due to friction and overheating of electronic components. At any time a malfunction of an electronic component or short circuit may cause fire and extensive damage. A spark inside a fuel container at gas station or tanker may cause immediate explosion. All current fire prevention and suppression systems are design in order to suppress fire after it starts, which might be too late. Current fire suppression systems are destructive for computerized equipment and cannot guarantee that fire will not start.

There are millions of powerful computers around the world, owned by large corporations, banks, communication companies, military and government agencies, many of them loosing millions of dollars in just one such fire.

There is no prior art on fire protection systems build inside a computer cabinet or fire hazardous container. The process and equipment described in this invention can guarantee that no fire will be able to start inside such computer cabinet or container having internal atmosphere with oxygen content under 10%.

The invention described in this document will prevent huge financial and environmental losses from industrial fires and will save many lives of fire fighters and general public.

SUMMARY OF THE INVENTION

A principal object of this invention is to provide a method for producing a fire safe hypoxic environment inside a computer cabinet or container with combustible, inflammable or explosive materials.

Further object of the present invention is the provision of an oxygen-depletion process and an apparatus for producing a low-oxygen environment inside a computer cabinet or industrial container, such equipment employing molecular-sieve adsorption or membrane-separation technologies.

A still further object of the invention is to provide a fire-retarding oxygen-depleted environment inside a computer room or industrial facility at standard, slightly reduced or increased atmospheric pressure and having oxygen content fewer than 10%.

Another object of this invention is to establish fire safe hypoxic environments inside computer cabinets or containers with combustible, inflammable or explosive materials by providing constant ventilation of such enclosures with oxygen-depleted air in order to remove heat and/or explosive fumes.

DESCRIPTION OF THE INVENTION

It is well known that combustion process requires oxygen, therefore the goal of this invention is to provide an extreme hypoxic normbaric environment inside a computer cabinet or any container in order to eliminate fire hazard completely.

This invention is based on a discovery made by the inventor during research with the Hypoxic Room System made by Hypoxico Inc. in New York. It was discovered that a normbaric hypoxic environment provides a different effect on ignition and combustion process than hypobaric or natural altitude environments with the same partial pressure of oxygen. For example, gasoline or any gas lighter would ignite and bum on an altitude of 19,000' (5,800 m) in the air having partial pressure of oxygen at 2.99" (76 mm) of mercury.

However, if we create a corresponding normbaric hypoxic environment with the same partial pressure of oxygen at 2.99" or 76 mm of mercury, we will find that gasoline will not burn or even ignite. Any attempt to ignite it would fail because even a gaslighter or gas torch would not ignite in this environment. It means that normbaric environments with corresponding oxygen content of 10% are absolutely safe against any fire hazard.

This invention provides reliable and inexpensive process and equipment for producing such fire-retarding environment inside a computer cabinet or container with fire hazardous material.

Figure 1:
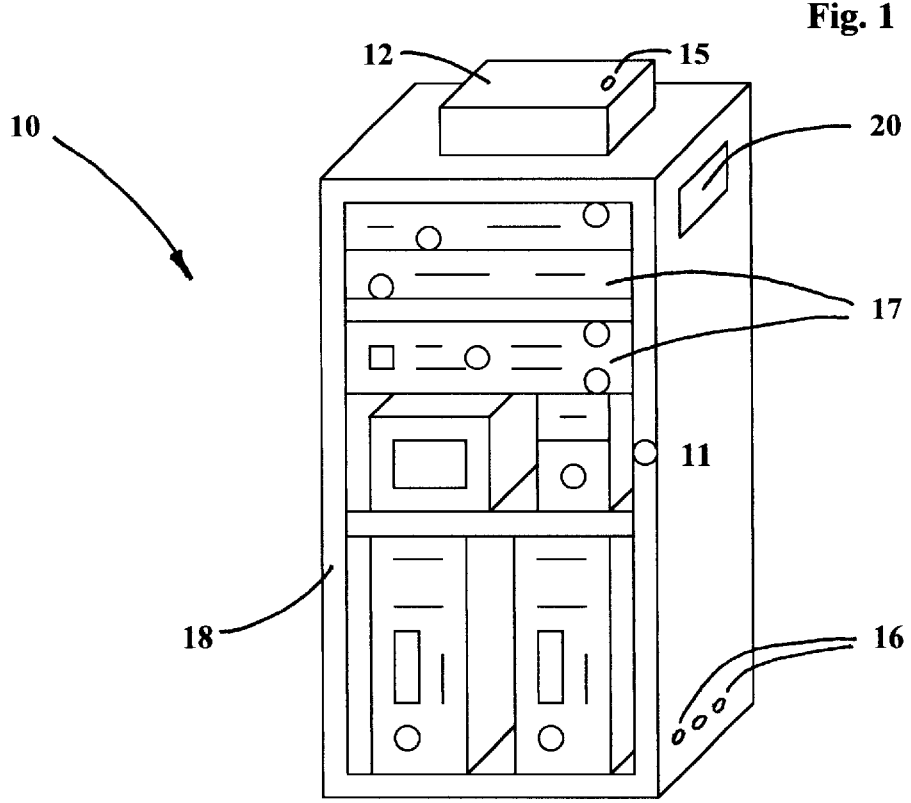
FIG. 1 shows the most preferred embodiment of the fire safe computer cabinet.

FIG. 1 shows the most preferred embodiment of the fire safe computer cabinet system 10 consisting of cabinet enclosure 11 having (in this case clear) door 18 and air intake openings 16 and filled with computer equipment or components 17, further having hypoxic generator 12 mounted on the top of the cabinet enclosure 11.

Figure 2:
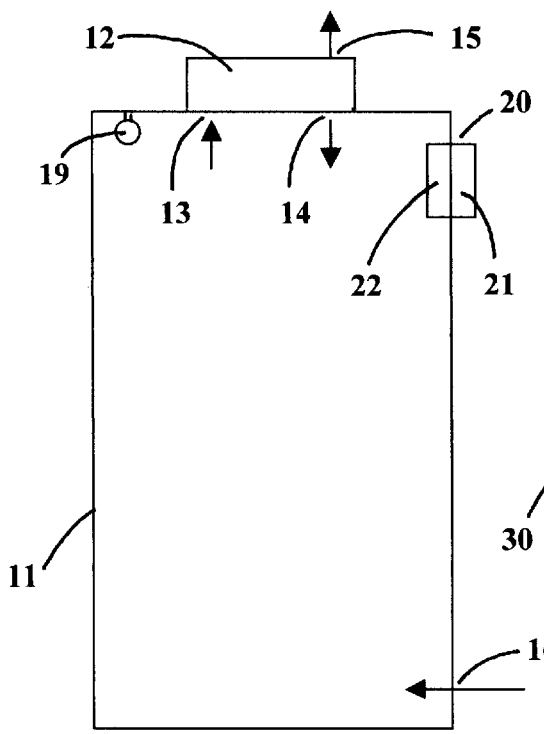
FIG. 2 illustrates schematically a working principle of the invented hypoxic fire prevention and suppression system employing hypoxic generator in extraction mode.

FIG. 2 shows schematically a working principle of the invented hypoxic fire prevention and suppression system 10 employing hypoxic generator in extraction mode.

The fire safe computer cabinet system 10 consists of a computer rack or cabinet enclosure 11 filled with computer devices or components and hypoxic generator 12 mounted directly on cabinet enclosure 11 and having air intake 13 and outlets 14 and 15. Computer cabinet 11 does not have to be absolutely airtight—it has multiple openings or holes 16, preferably in its lower portion. Openings 16 are shown schematically for better understanding of air circulation inside cabinet 11. In reality there is no need for special openings because air will always be able to enter cabinet through gaps around the door or through semi-airtight enclosure.

Hypoxic generator 12 draws air from the cabinet 11 through the intake 13 and extracts a part of oxygen from it allowing oxygen depleted air back into cabinet 11 through outlet 14. Oxygen-enriched gas mixture is disposed into atmosphere through disposal outlet 15. This process creates a slightly negative pressure inside cabinet 11 that works as a driving force for intaking fresh air through the openings 16, in order to equalize atmospheric pressures inside and outside of cabinet 11. Therefore semi-airtight cabinet 11 and even holes 16 in it are absolutely necessary functional components of this fire-retarding system.

Hypoxic generator starts working when door 18 is closed. At the beginning, the oxygen-enriched gas being removed from the system through disposal outlet 15 has a little higher oxygen content (about 30%) than ambient air entering cabinet 11 through holes 16 (20.94% at sea level). It means that oxygen content inside cabinet 11 will start dropping to a certain level below 10%. At the same time the oxygen content in the disposal fraction will also decrease to about ambient air level. The higher oxygen content in the disposal fraction, the lower will be the oxygen content inside cabinet 11. The lowest possible oxygen content inside cabinet 11 will be about 4.5%. Most important in the invented system is that it does not affect air composition in the room where the system 10 is installed. After oxygen content in cabinet 11 drops to desired level, the system 10 becomes balanced and will extract composition with oxygen content close to ambient air.

When oxygen content inside cabinet 11 drops below 7%, which will be detected by oxygen transducer 19 installed inside cabinet 11, hypoxic generator 12 turns off in order to save energy. When, after some time, oxygen content inside cabinet 11 reaches about 12%, transducer 19 will turn on hypoxic generator 12 again, and so further in cycles. Expensive oxygen transducer 19 is optional and can be replaced by a simple timer, which can turn on and off hypoxic generator 12 in preset intervals of time.

An air-cooling device 20 is installed in order to reduce temperature inside cabinet 11. The device 20 consists of thermoelectric module having cold sink plate 22 inside cabinet 11 and heat sink 21 outside cabinet 11. Big advantage of thermoelectric modules is the absence of refrigerant or any moving parts. Working principle of a thermoelectric cooler is well known and such devices are available on the market. Suitable device with high-performance thermoelectric module and high-fin-density cold sink and heat sink can be bought from TE Technology Inc. in Michigan, U.S.A.

It is advisable to direct the gas flow from outlet 14 against the cold sink 22 of the cooler 20 in order to provide better circulation of cold gas mixture inside cabinet 11 and better cooling of electronic components 17. Cooler 20 can be equipped with a simple thermostat that will control temperature inside cabinet 11 and save energy by turning off the cooler 20 when desired low temperature is reached.

Figure 3:
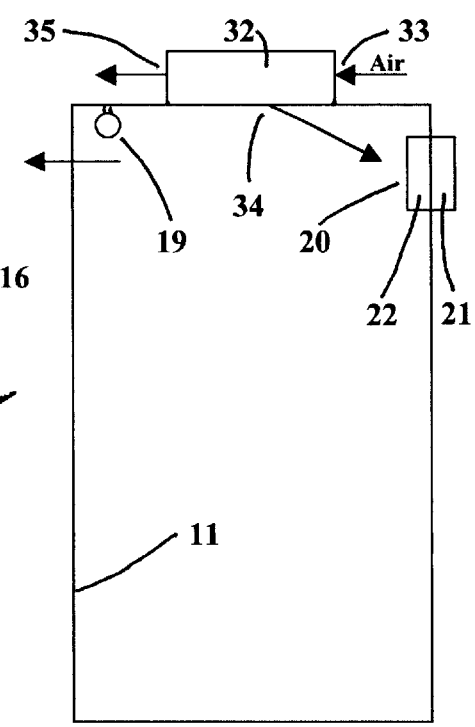
FIG. 3 illustrates schematically an alternative working principle of the invented hypoxic fire prevention and suppression system employing hypoxic generator in supply mode.

FIG. 3 illustrates schematically an alternative working principle of the invented hypoxic fire prevention and suppression system 30 employing hypoxic generator 32 in supply mode. This embodiment does not change anything in design of cabinet 11 and all other components. The only difference is in configuration of hypoxic generator 32 that is the same as generator 12, but connected different way to cabinet 11.

Hypoxic generator 32 takes in ambient air through intake 33 and separates it into oxygen-depleted fraction being transmitted inside cabinet 11 through outlet 34 and oxygen-enriched fraction being disposed into atmosphere through disposal outlet 35. This way cabinet 11 becomes constantly ventilated with low-oxygen gas mixture. Hypoxic generator shown below on FIG. 4 will be available in 2001 from Hypoxico Inc. in New York. It can provide oxygen-depleted air with any oxygen concentration in the range from 5% to 10%, which can be exactly preset at the factory.

The oxygen-depleted air entering cabinet 11 through outlet 34 is directed against cold sink 22 of the thermoelectric cooler 20 and sinks further down to the bottom of cabinet 11. In this embodiment openings 16 are moved to the higher position in order to exhaust warm gas mixture instead of cool one at the bottom of cabinet. This way, an effective air circulation inside cabinet 11 is assured, providing better cooling of computer components 17. The invented system 30 is entirely safe because disposal fraction having only slightly increased oxygen content of about 30% is instantly dissociated in the surrounding atmosphere. The system 30 does not affect air composition in surrounding atmosphere in any way because the oxygen amount in both fractions exiting the system is equivalent to the amount of oxygen in the air entering the system. Constant ventilation of the internal environment allows to remove heat from cabinet 11. This embodiment is most suitable for fire-hazardous containers because constant ventilation will allow removing of explosive fumes.

All parts of the systems 10 and 30 are shown schematically, in order to provide better understanding of the working principle. For instance, thermoelectric cooler 20 could be build in the air supply line before outlet 14 or 34, or hypoxic generator could be a free-standing unit connected with cabinet 11 through air conduits. Computer rack enclosure 11 can be computer cabinet or container with fire-hazardous materials. Transducer or timer 19 and cooler 20 are optional in some applications.

Other oxygen-extraction devices employing molecular-sieve adsorption, membrane-separation or other technologies can be used instead on hypoxic generator 12 or 32 in the invented system. However, it is highly recommended to use reliable hypoxic generators specially designed by Hypoxico Inc. in New York.

Figure 4:
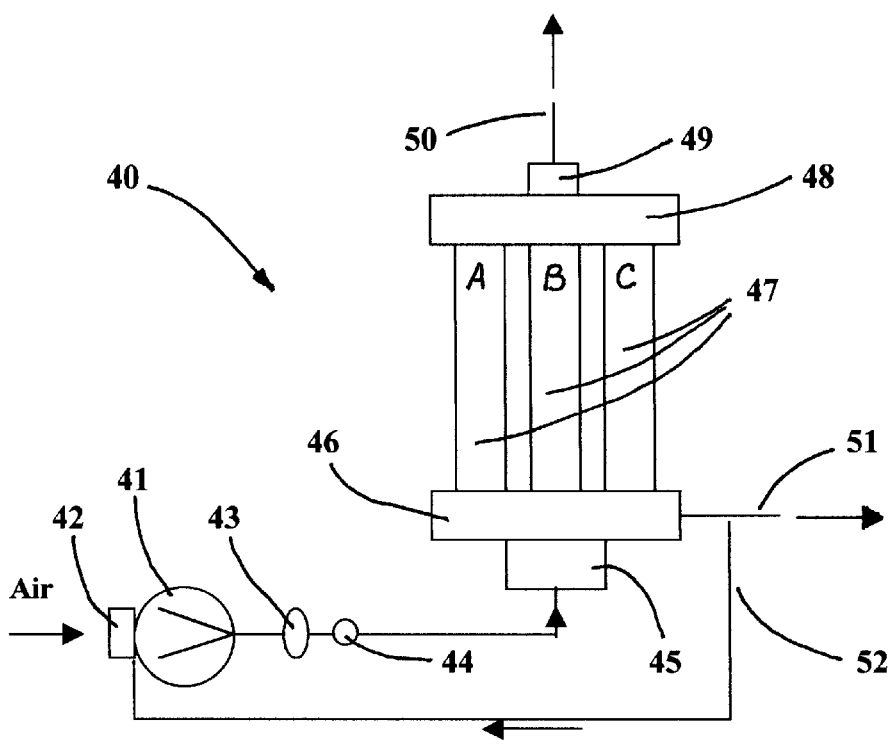
FIG. 4 presents a schematic view of a working principle of hypoxic generator employing nitrogen adsorbing molecular-sieve material and Pressure-swing adsorption technology.

FIG. 4 presents a schematic view of a working principle of hypoxic generator HYP-10/PSA/Z employing Pressure-swing adsorption technology, which will be available from Hypoxico Inc. in New York in 2001. This hypoxic generator 40 produces about 10 liters per minute of hypoxic air with preset oxygen content in the product between 5% and 10%. Miniature hypoxic generators producing 0.5 to 5 liters per minute will be available for smaller cabinets as well. All these generators employ molecular-sieve materials, mainly synthetic zeolites that adsorb nitrogen and allow oxygen to pass through the adsorbing material.

Compressor 41 draws ambient air through intake filter 42 and pressurizes it to about 15 psi or 1 bar. Further compressed air is chilled in air cooler 43 and transmitted through high-efficiency air filter 44 into distribution valve 45 mounted on manifold 46.

3 elongated containers 47 with molecular sieve material are mounted on manifold 46 the way that pressurized air is selectively and in cycles delivered into each container 47 allowing to pressurize them for several seconds at about 15 psi or 1 bar. Number of containers 47 may vary from 1 to 12 or more and they can be pressurized individually or in groups. On the other end all containers are interconnected with a collecting tank 48 having release valve 49.

Under pressure molecular sieve material in containers 47 allows oxygen-enriched fraction to pass through into tank 48, adsorbing remaining air gases, including mostly nitrogen and water vapors. Oxygen-enriched fraction is disposed into atmosphere through release valve 49 and disposal outlet 50. Distribution valve 45 continuously in cycling manner redirects the flow of compressed air from one container to two others. After several seconds of pressurization the molecular sieve material in container A becomes saturated with nitrogen-enriched fraction. At this time distribution valve 45 takes first position by opening container A for depressurization and redirects the flow of compressed air into containers B and C.

The nitrogen-enriched fraction from container A is transmitted inside manifold 46 into product outlet 51 having recycling loop 52. Part of nitrogen-rich product is transmitted through recycling loop 52 back into compressor intake 42. This allows significantly increasing efficiency of the hypoxic generator 40 without increasing working pressure, power consumption and weight. Low working pressure allows extending compressor life up to 5 years or more without any maintenance. Recycling loop 52 is only active for generators in supply mode as shown in embodiment 30 and is closed in generators working in extraction mode as shown on FIG. 2.

During the depressurization cycle of container A, a small amount of oxygen-enriched fraction being kept in tank 48 under minimal pressure by valve 49 is released back into container A, purging it from contaminating nitrogen.

Second position of distribution valve 45 sets containers C and A under pressure, depressurizing container B and transmitting its content into product outlet 51.

Third and last position of distribution valve 45 opens container C for depressurization and directs compressed air into containers A and B.

There is large selection of suitable distribution valves available on the market: from mechanical and electric to solenoid and air-piloted, both linear and rotary types. For this reason, working principles of these devices will be not explained in this work further. It is not difficult for those skilled in the art to find suitable valve and manifold for any number of containers 47 or their groups.

Figure 5:
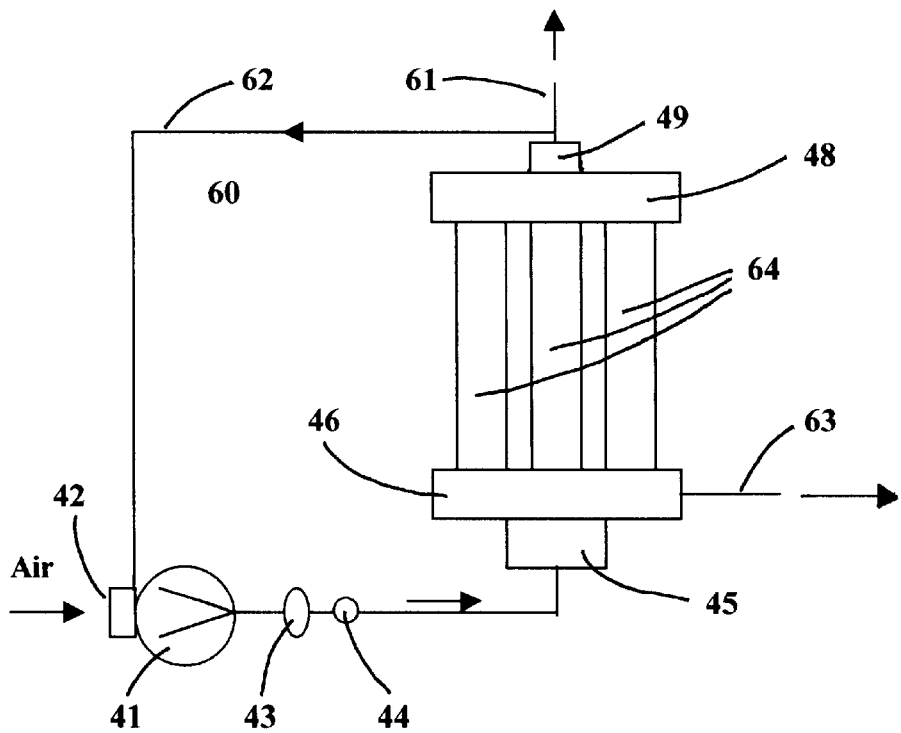
FIG. 5 presents a schematic view of a working principle of hypoxic generator employing oxygen adsorbing molecular-sieve material and Pressure-swing adsorption technology.

FIG. 5 presents a schematic view of an alternative working principle of hypoxic generator 60 employing the same Pressure-swing adsorption technology, but different adsorbent that adsorbs oxygen and allows nitrogen to pass through the adsorbing material. Carbon molecular-sieve material (CMSO2) has tiny hollow traps in its porous structure called "bottlenecks" that allow oxygen molecules to get in under pressure. Most of oxygen molecules being "trapped" inside such "bottlenecks" cannot find their way out in their chaotic movements. This technology is well known to those skilled in the art and is used in nitrogen generators.

Most of the components of the generator 60 are the same as in embodiment 40 and their working principle will not be described again. The only difference in this embodiment is that product and disposal outlets replace each other.

Compressed air pressurizes selectively containers 64 with oxygen adsorbing molecular-sieve material that allows nitrogen-enriched fraction to pass through into product outlet 61 via collecting tank 48 and release valve 49. A part of the product is returned back into system 60 through recycling conduit. 62. Oxygen-enriched adsorbat is released into atmosphere through disposal outlet 63.

Figure 6:
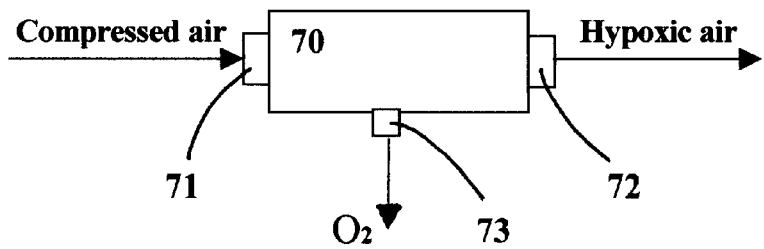
FIG. 6 shows schematically working principle of hypoxic generator employing Membrane air-separation technology.

Hypoxic generators 12 and 32 may also employ oxygen-enrichment membrane 70 that is schematically shown on FIG. 6. Usually such membranes are made as elongated container filled with synthetic hollow fibers that permit oxygen under pressure through their walls and allow nitrogen-enriched fraction to pass through the hollow fibers.

Compressed air enters membrane 70 through inlet 71 and is separated there into oxygen-enriched permeate being disposed through outlet 73 and hypoxic product delivered via product release valve 72.

Figure 7:
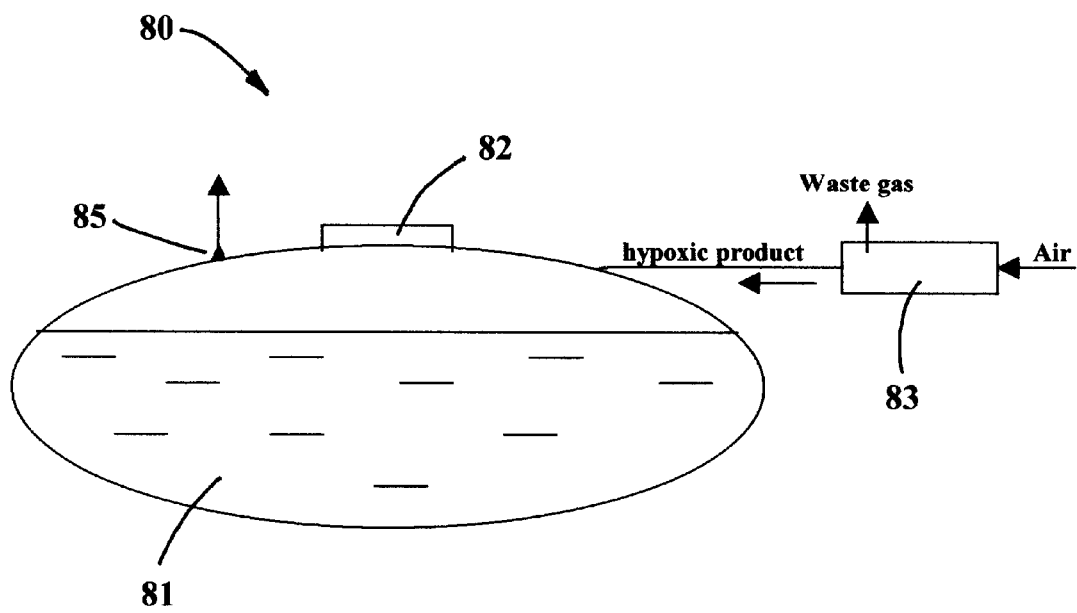
FIG. 7 illustrates a schematic view of an industrial container filled with highly inflammable fluid.

FIG. 7 shows another embodiment 80 of the invented Fire Prevention and Suppression System. A fire-hazardous industrial container 81 contains highly inflammable liquid (alcohol, acetone, gasoline, kerosene, liquid gas, paint, etc.) or dry fire-hazardous and explosive materials. Container 81 can be any industrial container, including stationary and mobile fuel tanks, sea tankers and cargo ships, underground fuel tanks at gas stations, dip and quench tanks, spray and coatings containers, spill containment dikes, storage enclosures and cabinets and other containers with fire hazardous materials and compositions.

Hypoxic generator 83 can be installed directly on container 81 like shown in embodiments 10 and 30 or at remote location, as shown on FIG. 7. It is advisable for such cases to use hypoxic generator in supply mode as shown in embodiment 30.

Hypoxic generator 83 supplies oxygen-depleted air into tank 81 having a hatch or entry 82 and/or vent 85. Heavy nitrogen rich product covers surface of the inflammable liquid and fills the rest of the container 81 replacing explosive vapors being expelled from container 81 through vent 85 or ventilation hole in hatch 82. Waste gas containing enriched-oxygen fraction is disposed from generator 83 into atmosphere.

Such fire-retarding environment can be kept inside tank 81 permanently by supplying nitrogen rich product in necessary intervals—after fire safe environment with the lowest oxygen content is established, generator 83 can be shut down and turned on again by a timing device.

The invented technology should be applied for ventilating underground communication tunnels, mining facilities, munitions and missile bunkers, underground military installations and other facilities in order to remove explosive gases and replace them with fire safe hypoxic air.

What is claimed is:

1. A system for providing a fire-extinguishing atmosphere in enclosed environments, said system comprising:
   a compressor having an inlet and a compressed gas outlet;
   an air separation device having an intake and first and second outlets, said intake is operatively associated with said compressed gas outlet and receiving an intake gas under pressure from said compressor;

said device taking in said intake gas and emitting a reduced-oxygen gas mixture having a lower concentration of oxygen than said intake gas through said first outlet and enriched-oxygen gas mixture having a greater concentration of oxygen than said intake gas through said second outlet;

said first outlet providing a fire-retarding gas mixture for said enclosed environments with oxygen content below 12%;

said second outlet selectively communicating with outside atmosphere and releasing said enriched-oxygen gas mixture into said outside atmosphere;

said air separation device employing a molecular-sieve adsorber and said intake being operatively associated with a distribution valve providing distribution of said intake gas to multiple inlets each communicating with an individual gas separation container filled with molecular-sieve material that under pressure adsorbs nitrogen and water vapors and allows said enriched-oxygen gas mixture to pass through into collecting tank communicating with said second outlet;

said collecting tank being operatively associated with all said separation containers and receiving selectively said enriched-oxygen gas mixture therefrom;

said separation containers being selectively pressurized and depressurized in cycles and releasing during each depressurization cycle said reduced-oxygen gas mixture being delivered into said first outlet;

said second outlet having release valve allowing to keep said enriched-oxygen gas mixture being collected in said collecting tank under increased atmospheric pressure, so when any of said separation containers depressurizes, a portion of said enriched-oxygen gas mixture is released from said tank back into said container purging said molecular sieve material from remaining nitrogen and water.

2. A system for producing a fire-extinguishing atmosphere in enclosed environments, said system comprising:

a compressor having an inlet and a compressed gas outlet;

an air separation device having an intake and first and second outlets, said intake is operatively associated with said compressed gas outlet and receiving an intake gas under pressure from said compressor;

said device taking in said intake gas and emitting a reduced-oxygen gas mixture having a lower concentration of oxygen than said intake gas through said first outlet and enriched-oxygen gas mixture having a greater concentration of oxygen than said intake gas through said second outlet;

said first outlet providing a fire-retarding gas mixture for said enclosed environments with oxygen content below 12%;

said second outlet selectively communicating with outside atmosphere and releasing said enriched-oxygen gas mixture into said outside atmosphere;

said air separation device employing a molecular-sieve adsorber and said intake being operatively associated with a distribution valve providing distribution of said intake gas to multiple inlets each communicating with an individual gas separation container filled with molecular-sieve material that under pressure adsorbs oxygen and allows said reduced-oxygen gas mixture to pass through into collecting tank communicating with said first outlet;

said collecting tank being operatively associated with all said separation containers and receiving selectively said reduced-oxygen gas mixture therefrom;

said separation containers being selectively pressurized and depressurized in cycles and releasing during each depressurization cycle said enriched-oxygen gas mixture being delivered into said second outlet.

3. The apparatus according to claim 1 and said distribution valve being air distribution device selected from the group consisting of electrical, mechanical, air piloted and solenoid valves, both linear and rotary configuration, with actuators controlled by pressure, mechanical spring, motor and timer;

said distribution valve being communicating with and mounted on manifold that is selectively communicating with said multiple separation containers and said first outlet, and selectively allowing periodic access of pressurized air inside said containers and exit of said reduced-oxygen gas mixture therefrom.

4. The apparatus according to claim 2 and said distribution valve being air distribution device selected from the group consisting of electrical, mechanical, air piloted and solenoid valves, both linear and rotary configuration, with actuators controlled by pressure, mechanical spring, motor and timer;

said distribution valve being communicating with and mounted on manifold that is selectively communicating with said multiple separation containers and said second outlet, and selectively allowing periodic access of pressurized air inside said containers and exit of said enriched-oxygen gas mixture therefrom.

5. An apparatus for producing a fire-extinguishing atmosphere in enclosed environments, said apparatus comprising:

a compressor having an inlet and a compressed gas outlet;

an air separation device having an intake and first and second outlets, said intake is operatively associated with said compressed gas outlet and receiving an intake gas under pressure from said compressor;

said device taking in said intake gas and emitting a reduced-oxygen gas mixture having a lower concentration of oxygen than said intake gas through said first outlet and enriched-oxygen gas mixture having a greater concentration of oxygen than said intake gas through said second outlet;

said first outlet providing a fire-retarding gas mixture for said enclosed environments with oxygen content below 12%;

said second outlet selectively communicating with outside atmosphere and releasing said enriched-oxygen gas mixture into said outside atmosphere;

said air separation device employing a membrane air separator for separating said intake gas into said reduced-oxygen and enriched-oxygen gas mixtures.

* * * * *